Feb. 19, 1957  P. C. SKRMETTA  2,781,544
SEAFOOD CLEANING MACHINE

Filed June 10, 1955  4 Sheets-Sheet 1

Paul C. Skrmetta
   INVENTOR.

BY *Clarence A. O'Brien*
  *and Harvey B. Jacobson*
       Attorneys

Feb. 19, 1957 P. C. SKRMETTA 2,781,544
SEAFOOD CLEANING MACHINE
Filed June 10, 1955 4 Sheets-Sheet 2

Paul C. Skrmetta
INVENTOR.

BY
Attorneys

Feb. 19, 1957 P. C. SKRMETTA 2,781,544
SEAFOOD CLEANING MACHINE
Filed June 10, 1955 4 Sheets-Sheet 3

Paul C. Skrmetta
INVENTOR.

BY
Attorneys

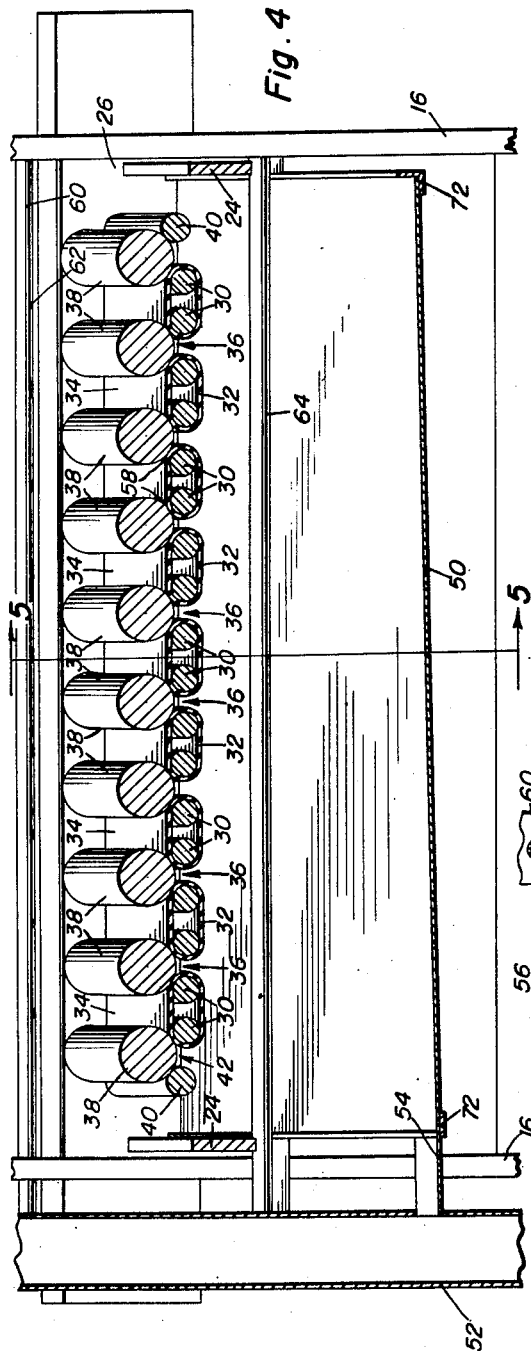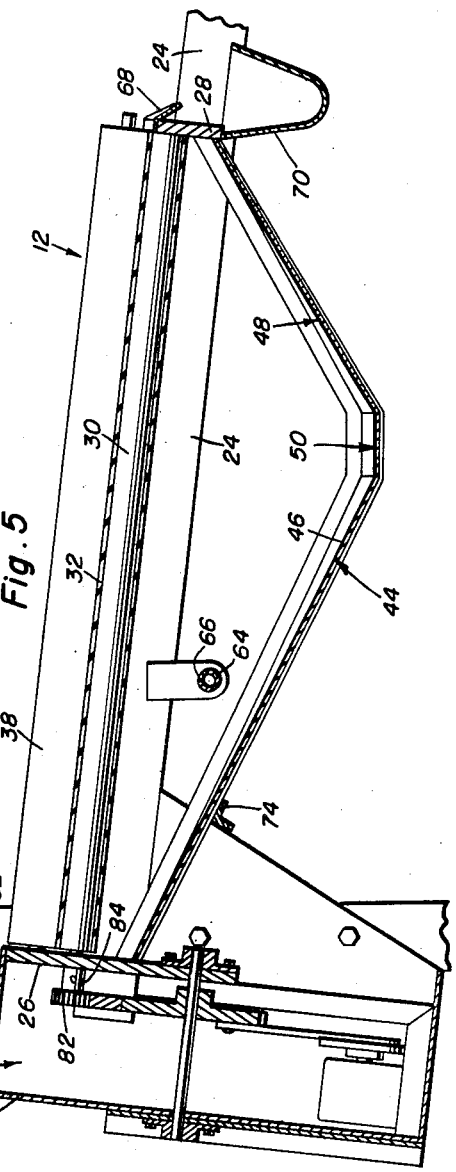
Paul C. Skrmetta
INVENTOR.

United States Patent Office 2,781,544
Patented Feb. 19, 1957

2,781,544
SEAFOOD CLEANING MACHINE

Paul C. Skrmetta, New Orleans, La., assignor of twelve and one-half percent to Herman J. Agregaard and twelve and one-half percent to Antoine Rodi Rodriquez, both of New Orleans, La., and fifty percent to Raphael O. Skrmetta, New Orleans, La.

Application June 10, 1955, Serial No. 514,561

19 Claims. (Cl. 17—2)

The present invention relates generally to an apparatus for cleaning seafood, and more particularly relates to an improved apparatus for removing hulls, shells, appendages and other inedible portions from seafood, such as shrimp, sea prawn, crawfish and the like, this application being a continuation-in-part of my copending application, Serial No. 412,149, filed February 24, 1954, now abandoned.

The primary object of the invention is to provide an improved apparatus for cleaning shrimp and the like without damage to the meat of the shrimp, the apparatus stripping the hull or shell from the shrimp cleanly and completely during the operation of the apparatus.

A highly important object of the invention, ancillary to the primary object, is to provide a novel, transversely rectilinearly reciprocating longitudinally extending shrimp cleaning platform with shrimp peeling members engaging opposite longitudinal edges of the platform to peel the shrimp in conjunction with the transverse reciprocal movement of the platform during the passage of the shrimp longitudinally along the platform.

A still further object of the invention is in the provision of a seafood cleaning apparatus wherein the peeling members of each cleaning unit of the apparatus comprise peeling rollers which operate in response to the transverse reciprocation of the flat, shrimp receiving platforms.

An important object of the invention, ancillary to the preceding object, resides in the provision of a seafood cleaning apparatus including spaced, parallel flat platforms forming throats therebetween, the shrimp peeling rollers freely rotatably supported in the throats by resting on the adjacent longitudinal edge portions of adjacent platforms whereby they may be easily removed for cleaning or replacement with other rollers engaging the platforms at different angles of attack.

A further object of the invention is in the provision of a shrimp cleaning apparatus utilizing vertically spaced tiers of shrimp cleaning stations, the shrimp falling from one tier to the next during the cleaning operation.

A still further object of the invention, ancillary to the preceding object, is in the provision of different sized peeling rollers in the different tiers of the apparatus to provide a complete shrimp cleaning operation as the shrimp pass through the apparatus.

A last object of the invention to be mentioned specifically, but by no means the least important object of the invention, is in the provision of shrimp cleaning apparatus including shrimp receiving platforms and shrimp peeling rollers cooperating with the platforms to peel the shrimp wherein the platform possesses a considerably higher coefficient of friction than the rollers, whereby the shrimp are subjected to stripping by the rollers without bruising or other injury to the meat.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a cross-sectional view through one of the cleaning tiers of the apparatus taken upon an enlarged scale substantially along the plane of section line 4—4 of Figure 1;

Figure 5 is a longitudinal sectional view through the tier of Figure 4 taken substantially along the plane of section line 5—5 of Figure 4;

Figure 1:
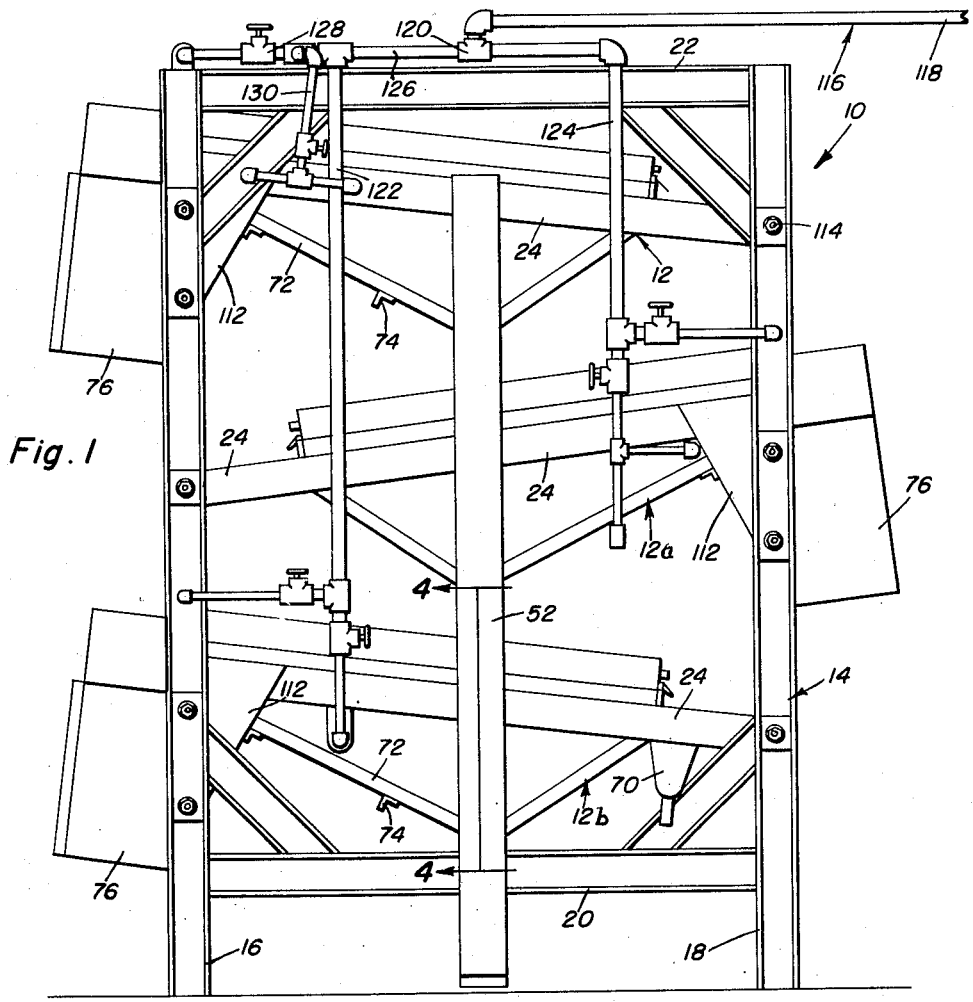
Figure 1 is a side elevational view of a seafood cleaning apparatus embodying the principles of the present invention.
Figure 8:
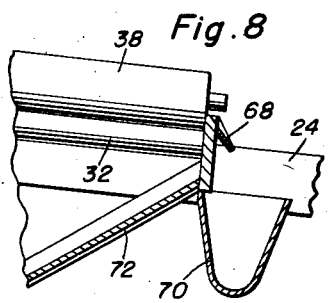
Figure 8 is a cross-sectional view taken upon an enlarged scale across the discharge end of the bottom one of the tiers substantially along the plane of section line 8—8 in Figure 3.

Referring now to the drawings in detail, and most particularly to Figure 1, the seafood cleaning apparatus constituting the present invention is designated in its entirety by the numeral 10. Essentially, the apparatus comprises a plurality of vertically spaced tiers 12, 12a and 12b supported on a rectangular framework 14. Although three tiers are shown in Figure 1, this number is shown only for the purpose of illustrating a preferred embodiment of the invention. It is to be understood that a greater or less number of tiers may be utilized in the practice of the invention as necessitated or desired by the user of the apparatus.

The supporting framework 14 is comprised of front and rear corner legs 16 and 18 interconnected to one another adjacent their lower ends by side frame members 20 and at their upper ends by side frame members 22.

Basically, each of the tiers 12 is identical to the others; consequently, a description of one will suffice for all, and for such description, attention is directed most particularly to Figures 3, 4, 5 and 8. Each tier comprises a pair of spaced, side frame members 24 interconnected to one another at their forward ends and adjacent their rear ends by front and rear end members 26 and 28, respectively, so as to form a rectangular frame.

Extending between the end members 26 and 28 are a plurality of longitudinally extending, spaced, parallel pairs of drive rollers 30, the drive rollers of each pair being also spaced from one another. Entrained over each pair of drive rollers 30, which also constitute support means for the flexible side edges of the platform, is an endless belt 32, the upper run of which provides a longitudinally extending, flat, platform surface 34 upon which shrimp are received for cleaning.

The endless belt 32 entrained over each pair of drive rollers 30 extends the length of the drive rollers 30 of its associated pair of drive rollers whereby the platform 34 formed thereby is also longitudinally extending.

The space between each pair of endless belts 32 provides a throat 36. Shrimp peeling members in the form of peeling rollers 38 which extend longitudinally between the ends 26 and 28 of the tier frame are disposed over the throats 36 so that longitudinally extending portions thereof rest on the adjacent edges of adjacent platforms 34 to define the longitudinal edges of these platforms. End members 26 and 28 of the frames for the tier prevent longitudinal movement of the peeling rollers 38. The peeling rollers 38 extend above the platform surfaces 34 and cooperate with the platforms to form shrimp cleaning troughs.

Spaced from the end rollers 30 of the row of platform forming belts 32 are idler rollers 40 which form end throats 42 within which the end peeler rollers 38 are disposed. As can be noted from the drawings, each tier 12 is inclined from the horizontal and has the forward or inlet member 26 disposed at a higher elevation than the rearmost or discharge end member 28 so that passage of shrimp down the platforms 34 is longitudinally by gravity flow.

Carried by the frame members 24, 26 and 28 of each ties 12 and disposed beneath the shrimp cleaning platforms 34 of the tier is a drain pan 44. The drain pan 44 is preferably in the shape of a V-shaped trough having inclined bottom portions 46 and 48 thereof forming trough sides joined at their adjacent ends to a trough bottom forming portion 50.

The trough bottom forming portion 50 of each drain pan 44 is inclined transversely from one side member 24 toward the other side member 24 and opens into a drain collection chute 52 disposed along one side of the apparatus 10. Short connecting conduit 54 connects the lower end of the trough bottom 50 with the vertical chute 52 extending along the side of the apparatus.

Means 56 is provided for oscillating the drive rollers 30 to rectilinarly reciprocate the platform forming surfaces 34 of the endless belts 32 between each set of peeler rollers 38 disposed at the opposing longitudinal edges of each platform surface 34. The peeler rollers 38 resting against the opposite longitudinal downwardly curved side edges of each endless belt 32 in the throat 36 formed between the platforms 34 reversibly rotate in response to the reciprocatory movement of the platform surfaces 34, the end rollers 38, of course, reversibly rotating in the end throats 42 formed between the end idler rollers 40 and the end edges of the end platforms 34.

The shrimp cleaning operation carried out in each tier is as follows. Shrimp or other seafood to be de-hulled or shelled is fed over the front end member 26 of each tier so that the shrimp are deposited on the platforms 34 formed by the upper runs of the endless belts 32. Then, through the operation of the oscillating means 56, the drive rollers 30 are oscillated, which oscillation is transmitted to the platform surfaces 34 in the form of transverse reciprocatory movement between each pair of peeler rollers 38. Thus, the net direction of flow of shrimp or other seafood is longitudinally from their inlet at the front end member 26 to their discharge at the rear end member 28 of each tier 12, but during this longitudinal movement, the shrimp are moved from side to side on each of the platforms 34 for engagement with the edge peeler rollers 38. These peeler rollers 38 act initially to pinch the shell from the shrimp or other seafood between the roller 38 and the belt surface 34. As the shell is grasped in the crotch 58 thereof between the peeling roller 38 and the associated platform surface 34, the shrimp is, of course, maintained in contact with the peeler roller 38. However, the belt 34, being of a rubber-like or other material having a much higher coefficient of friction than the metallic rollers 38 tends to continue the stripping action of the shell by virtue of the engagement of the shell on this belt. However, the body of the shrimp which is in engagement with the surface of the peeler roller 38 slides easily with respect to this surface so that the body of the shrimp is not drawn into the crotch 58 where each peeler roller and its associated platform contact, the body instead being simply bumped against the peeler rollers and itself tending to turn to assist the stripping action of the shell from the shrimp.

Since the peeling rollers 38 simply rest upon the platform over the throats 36 by their own weight, they may be easily removed and replaced with different sizes peeler rollers to vary the angle of attack of the rollers 38 with the platform surfaces 34 and the crotches 58 formed therebetween to increase or decrease the pinching action on the shells of the seafood or forgo any pinching action and provide basically an abrading action of the belt with the shell of the seafood.

Further, by utilizing the flat platforms, the reciprocation of the platform may be such that each of the peeler rollers 38 rotates a number of times for each reciprocatory movement of the platform. Thus, in addition to providing an easy manner of washing the shells from the peeler rollers 38 through the throats 36 into the trough bottom 50 for subsequent disposal through the drain chute 52, the peeling action on the shrimp may be greatly accelerated over existing shrimp peeling machines with no danger of bruising the shrimp. Also, the flat platform surface enables the shrimp or other seafood to be positively moved between the crotches 58 at opposite longitudinal edges of each platform 34 since there are no rises or other obstructions for the seafood to overcome in moving between the crotches.

To efficiently lubricate the platforms and peeler rollers, extending transversely across and disposed above each of the tiers 12 is a suitable water spray pipe 60 having spray orifices 62 for spraying a water spray stream onto the peeling rollers 38 and the platform surfaces 34. Also, extending transversely across the pan 44 beneath the drive rollers 30 is a second water spray pipe 64 having upwardly opening spray orifices 66 for spraying the under-surfaces of the belts and the portions of the drive rollers 38 extending into the throats 36, thereby washing shells through the throats into the pan 44 and maintaining a wet surface on the belts. The water from the spray pipe 64 cascades down into the trough bottom 50 for washing the shells through the trough bottom and into the drain chute 52.

Across the discharge end 28 of each tier 12, there is a downwardly extending outturned lip 68 for permitting the shrimp to drop to the next lower tier and to drop from the bottom tier onto the shrimp receiving machine trough 70 from whence the shrimp are conveyed from the machine.

To stiffen the drain pan 44, angle brace members 72 engage the bottom side edges and are attached at their free ends to the side members 24 of the tier frame. Cross-braces 74 extend underneath the bottom of the pan 44 and are connected at their outer ends to the bracing members 72.

As noted before, the driving rollers 30 of each tier are provided with the drive means 56. The drive means 56 comprises a housing 76 carried by the flat inlet end member 26 of the associated tier. Transversely spaced brackets 78 carried by the housing interiorly thereof reciprocably carry a rack having teeth 81 formed in the upper surface thereof which mesh with gears 82 formed on the reduced ends 84 of the drive rollers 30 which are journaled through the inlet end frame member 26 of the tier.

A motor 86 is coupled to a suitable speed reducer 88 which, in turn, rotates a disk 90 having one end of a crank arm 100 eccentrically attached thereto, as at 102. The other end of the crank arm 100 is attached eccentrically to a large gear wheel 104, as at 106, which wheel is rotatably mounted on the outer wall of the housing with the gear teeth thereof meshing with gear teeth 108 formed along an intermediate portion of the bottom edge of the rack 80. The operation is relatively simple in that once the motor 86 is actuated, the gear wheel 104 reciprocates to reciprocably move the rack 80 and thereby oscillate the drive rollers 30 which, in turn, transversely, rectilinearly reciprocate the platform surfaces 34 between the peeler rollers 38.

Figure 2:
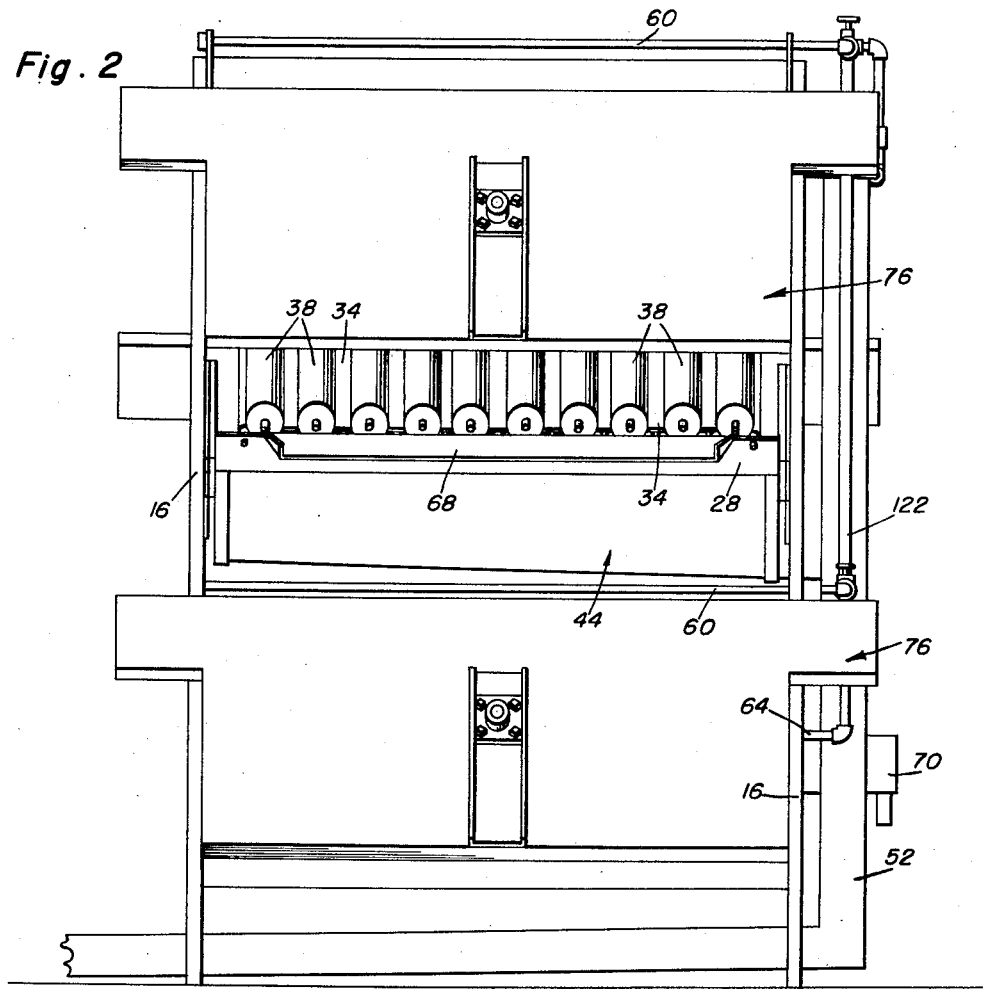
Figure 2 is an end elevational view of the seafood cleaning apparatus.
Figure 6:
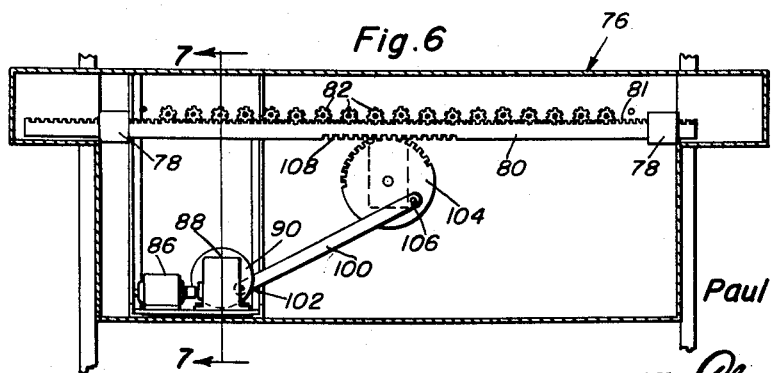
Figure 6 is a cross-sectional view through the left hand portion of Figure 5, just inside the end wall of one of the covering housings for the operating structure for the upper one of the cleaning tiers disclosing the manner in which the shrimp receiving platforms of the tier are oscillated.
Figure 3:
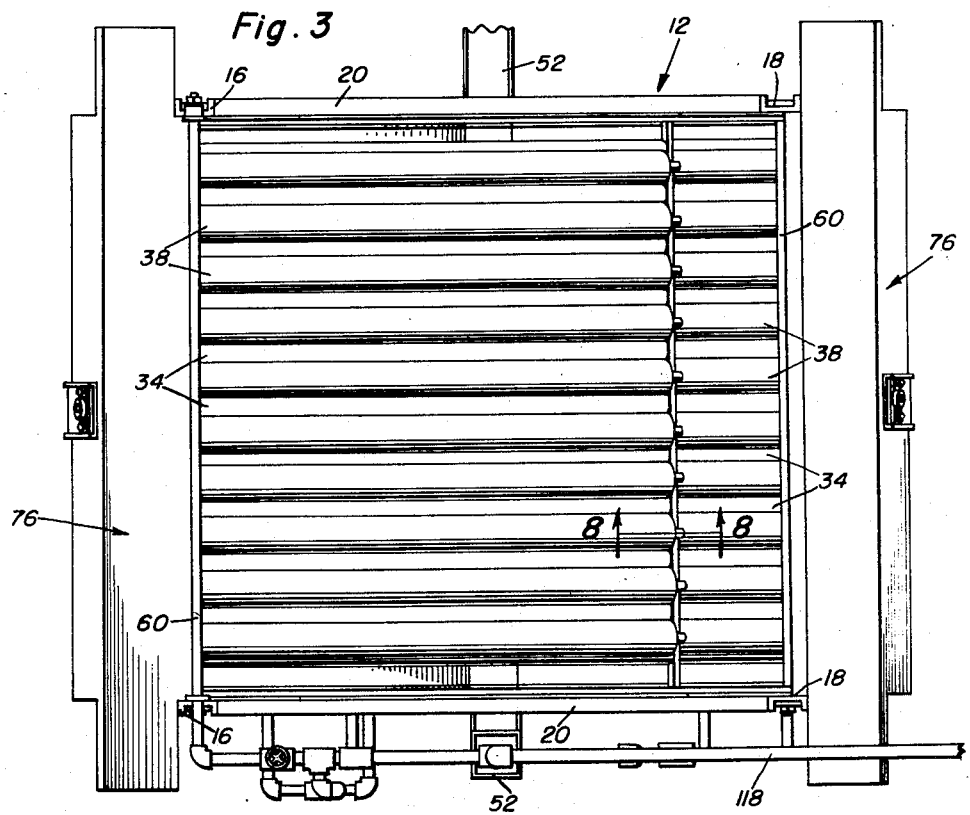
Figure 3 is a top view of the cleaning apparatus.
Figure 7:
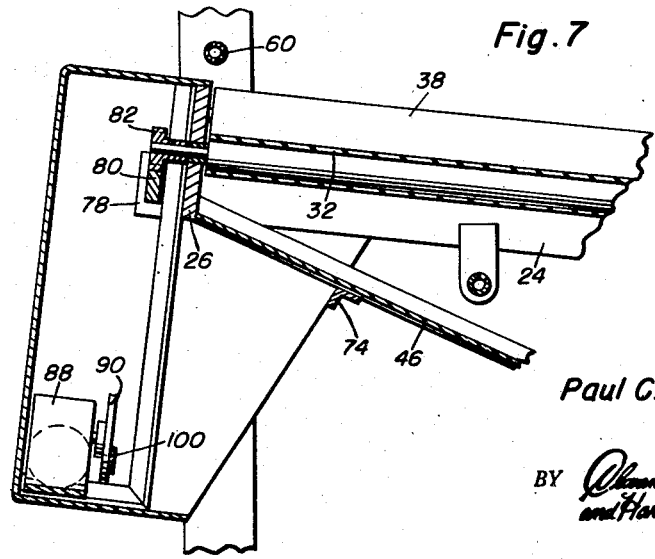
Figure 7 is a fragmentary enlarged cross-sectional view of the operating means and housing being taken substantially along the plane of section line 7—7 of Figure 6.

Referring now again to Figures 1 and 2 particularly, it will be seen that the tiers 12 are arranged in vertically staggered, spaced relation on the framework 14. Brackets 112 attach the drive mechanism housings 76 and the inlet ends of the side frame members 24 of each tier to the associated corner posts of the framework 14 while suitable bolts or other fasteners 114 fasten the discharge end portions of the side frame members 24 of each tier to their associated corner post.

As will be noted from Figure 1, adjacent tiers are oppositely sloped so that the lower discharge end of one is disposed in laterally spaced relation to and above the upper inlet end of the next lower tier. Thus, as the peeled seafood fall from one tier to the next, they fall immediately into the inlet end of the next lower adjacent tier from whence the cleaning operation is again commenced longitudinally of the tier from whence they again fall to the next lower tier until the lowermost tier is reached, from the discharge end of which the shrimp are removed from the apparatus by passage through the trough 70. End members 26 and 28 of each tier interconnect the corner posts 16 with one another and the corner posts 18 with one another, while the side frame members 24 of each tier interconnect the corner members 16 and 18 to one another intermediate the upper and lower crossmembers 20 and 22 of the framework 14.

To supply water to the spray pipes 60 and 64 of each tier, the water supply system 116 shown in Figure 1 may be utilized.

As will be noted, the water supply system 116 includes a main supply pipe 118 which through the T-fitting 120 branches off into curved downwardly extending branch conduits 122 and 124, respectively. Connecting conduit 126 connects the branch conduits 122 and 124 to one another and to the main supply conduit 118. The spray pipe above the shrimp receiving troughs formed by the peeler rollers 38 and platforms 34 on the uppermost tier comes off the connecting conduit 126 and the liquid supply thereto may be controlled by means of the valve 128 on the connecting conduit 126.

Further, the drain pan spray pipe 64 of the upper tier may be supplied by a branch conduit 130 extending from the connecting conduit 126. Branch conduit 122 supplies the spray pipes 60 and 64 of the lowermost tier 12 and branch conduit 124 supplies the spray pipes 60 and 64 of the intermediate tier 12.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A shrimp cleaning machine including a longitudinally extending generally flat shrimp receiving platform having flexible, transversely downwardly curved side edges, support means over which said flexible side edges are entrained, means operatively connected to said platform for transversely reciprocating the same, longitudinally extending rollers engaging the top surface of the platform adjacent the side edges of the latter to thereby form crotches with the platform, said rollers being oscillatably driven by their contact with the top surface of the platform, the surfaces of the rollers and platform having different coefficients of friction whereby a shrimp received in a crotch will cling to one surface and slip on the other surface to thereby rotate the shrimp until a loose end of its shell is caught between the roller and platform and the shell is unwound from the shrimp and drawn through the crotch and from the platform.

2. A shrimp cleaning machine including a longitudinally extending generally flat shrimp receiving platform having flexible, transversely downwardly curved side edges, support means over which said flexible side edges are entrained, means operatively connected to said platform for transversely reciprocating the same, a longitudinally extending roller engaging the top surface of the platform adjacent one side edge thereof to form a shrimp peeling crotch with said platform, said roller being oscillatably driven by its contact with the top surface of the platform, the surfaces of the roller and platform having different coefficients of friction whereby a shrimp received in the crotch will cling to one surface and slip on the other surface to thereby rotate the shrimp until a loose end of its shell is caught between the roller and platform whereby the shell is unwound from the shrimp, as the latter is rotated, and is drawn through the crotch and from the platform, and means disposed adjacent the other side edge of the platform and upon the top surface thereof for stopping the movement of shrimp away from the roller upon reciprocation of the platform in one direction whereby the shrimp will be again returned to the roller upon movement of the platform in the other direction.

3. The combination of claim 1 wherein said platform comprises a conveyor belt, at least one roller supporting and imparting reciprocatory motion to said belt, said first mentioned means being operatively connected to said driving roller for oscillation of the same.

4. A shrimp cleaning machine including a longitudinally extending generally flat shrimp receiving platform having flexible, transversely downwardly curved side edges, support means over which said flexible side edges are entrained, means operatively connected to said platform for transversely reciprocating the same, a longitudinally extending roller engaging the top surface of the platform adjacent one side edge thereof to form a shrimp peeling crotch with said platform, said roller being oscillatably driven by its contact with the top surface of the platform, the surfaces of the roller and platform having different coefficients of friction whereby a shrimp received in the crotch will cling to one surface and slip on the other surface to thereby rotate the shrimp until a loose end of its shell is caught between the roller and platform whereby the shell is unwound from the shrimp, as the latter is rotated, and is drawn through the crotch and from the platform, and means disposed adjacent the other side edge of the platform and upon the top surface thereof for stopping the movement of shrimp away from the roller upon reciprocation of the platform in one direction whereby the shrimp will be again returned to the roller upon movement of the platform in the other direction, said platform comprising a conveyor belt, at least one roller supporting and imparting reciprocatory motion to said belt, said first mentioned means being operatively connected to said driving roller for oscillation of the same.

5. The combination of claim 1 wherein said platform and pair of rollers have their respective top surface and longitudinal axes lying in planes inclined to the horizontal whereby shrimp will travel longitudinally thereof upon transverse reciprocation of said platform, a second platform and pair of rollers disposed beneath the first mentioned platform and rollers and lying in planes reversely inclined to the horizontal relative to the first mentioned planes, whereby shrimp discharged from the lower ends of the first mentioned platform and rollers will be received upon the upper ends of the second platform and pair of rollers.

6. The combination of claim 2 wherein said platform, roller and stopping means have their respective top surface and longitudinal axes lying in planes inclined to the horizontal whereby shrimp will travel longitudinally thereof upon transverse reciprocation of said platform, a second platform, roller and stopping means disposed beneath the first mentioned platform, roller and stopping means and lying in planes reversely inclined to the horizontal relative to the first mentioned planes, whereby shrimp discharged from the lower ends of the first mentioned platform, roller and stopping means will be received upon the upper ends of the second platform, roller and stopping means.

7. The combination of claim 1 wherein said reciprocating means includes a pair of spaced, longitudinally extending oscillating drive rollers, an endless belt entrained over said drive rollers, one run of said belt comprising said platform.

8. The combination of claim 2 wherein said reciprocating means includes a pair of spaced, longitudinally extending oscillating drive rollers, an endless belt entrained over said drive rollers, one run of said belt comprising said platform.

9. A shrimp cleaning machine including a pair of longitudinally extending, generally flat shrimp receiving platforms disposed in side by side relation and having their adjacent flexible, transversely downwardly curved side edges defining a throat therebetween, support means on which said curved side edges are entrained, means operatively connected to said platforms for simultaneously transversely reciprocating the same, a longitudinally extending roller engaging the top surfaces of both said platforms adjacent the curved side edges of each to form shrimp peeling crotches with said platforms, said roller being oscillatably driven and in contact with the top surfaces of said platforms, the surface of the roller having a different coefficient of friction from those of the platforms whereby shrimp received in the crotches will cling to one surface and slip on the other surface to thereby rotate the shrimp until loose ends of their shells are caught between the roller and the platforms whereby the shells are unwound from the shrimp, as the latter are rotated, and are drawn through the crotches from the platform and discharged into said throat, and means disposed adjacent the side edges of the platforms which are remote from said adjacent side edges and upon the top surface thereof for stopping the movement of the shrimp away from the roller upon reciprocation of a platform in one direction whereby the shrimp will be again returned to the roller upon movement of a platform in the other direction.

10. The combination of claim 9 wherein at least one of said platforms comprises the upper run of an endless belt, a pair of rollers over which said belt is entrained and by which it is supported.

11. The combination of claim 9 wherein both of said platforms comprise the upper run of an endless belt, a pair of rollers on which said belt is entrained and by which it is supported.

12. The combination of claim 1 wherein said rollers are supported solely by their engagement with the platform, means operatively associated with the platform and rollers for preventing relative axial and lateral displacement of the rollers relative to the platform but permitting free vertical movement relative thereto.

13. The combination of claim 2 wherein said roller is supported solely by its engagement with the platform, means operatively associated with the platform and roller for preventing relative axial and lateral displacement of the roller relative to the platform but permitting free vertical movement relative thereto.

14. The combination of claim 9 wherein said roller is supported solely by its engagement with the platforms, means operatively associated with the platforms and roller for preventing relative axial and lateral displacement of the roller relative to the platforms but permitting free vertical movement relative thereto.

15. A shrimp peeling machine comprising a shrimp support including a substantially flat surface supporting the shrimp during peeling, first and second rotary peeling members operatively associated with said support and having axes of rotation disposed in a constant parallel relation to each other, means associated with one of said members and said support to cause relative bodily movement between said peeling members and said support whereby to peel said shrimp, and means for removing the trash from said machine.

16. A shrimp peeling machine comprising a shrimp support including a substantially flat surface supporting the shrimp during peeling, first and second rotary peeling members operatively associated with said support and having axes of rotation disposed in a constant parallel relation to each other, means associated with one of said members and said support to cause relative bodily movement between said peeling members and said support directed along a straight line that is perpendicular to said axes whereby to peel said shrimp, and means for removing the trash from said machine.

17. A shrimp peeling machine comprising a shrimp support including a substantially flat surface supporting the shrimp during peeling, first and second rotary peeling members operatively associated with said support and having axes of rotation disposed in a constant parallel relation to each other and to said flat surface and each axis lying in a plane perpendicular to said flat surface, means associated with one of said members and said support to cause relatively bodily movement between said peeling members and said flat surface of said support whereby to peel said shrimp, and means for removing the trash from said machine.

18. A shrimp peeling machine comprising a shrimp support including a substantially flat surface supporting the shrimp during peeling, first and second rotary peeling members operatively associated with said support and having axes constantly disposed in planes perpendicular to said flat surface, means associated with one of said members and said support to cause relative bodily movement between said peeling members and said flat surface of said support whereby to peel said shrimp, said planes being transverse and at a constant attitude to the direction of said relative movement, and means for removing the trash from said machine.

19. A shrimp peeling machine comprising a shrimp support including a substantially flat surface supporting the shrimp during peeling, first and second rotary peeling members operatively associated with said support and directly contacting said support and each extending substantially entirely across said support, means associated with one of said members and said support to cause relative bodily movement between said peeling members and said support whereby to peel said shrimp, and means for removing the trash from said machine.

References Cited in the file of this patent

UNITED STATES PATENTS

| 1,022,609 | Thompson | Apr. 9, 1912 |
| 1,835,190 | Stansbury | Dec. 8, 1931 |
| 2,537,355 | Lapeyre et al. | Jan. 9, 1951 |
| 2,574,044 | Lapeyre et al. | Nov. 6, 1951 |

FOREIGN PATENTS

| 526,128 | Great Britain | Sept. 11, 1940 |